Patented May 22, 1945

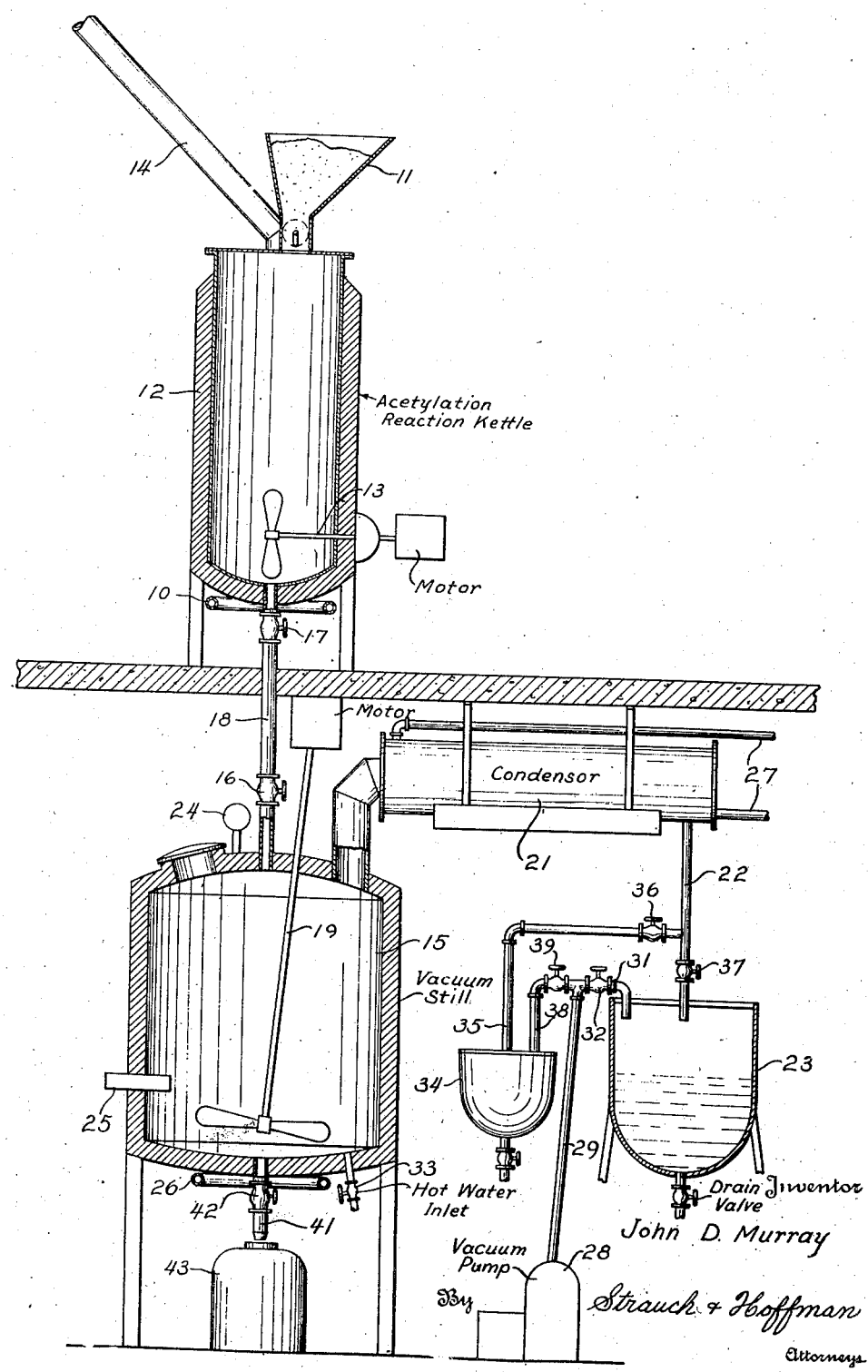

2,376,378

UNITED STATES PATENT OFFICE 2,376,378

ACETYLATION PROCESS AND PRODUCT

John D. Murray, Chicago, Ill.

Application September 20, 1941, Serial No. 411,745

6 Claims. (Cl. 260—234)

The present invention relates to acetylation products of starch and dextrin and methods of making the same, and is more particularly concerned with primary, low viscosity acetylation products of starch or dextrin suitable for use in thermoplastic coating compounds.

This application is a continuation-in-part of my copending application Serial No. 296,295, filed September 23, 1939, which in turn was a continuation-in-part of my earlier application Serial No. 251,944, filed January 20, 1939.

To be suitable for ordinary commercial purposes, starch, dextrin and other carbohydrate acetates should be readily soluble in commercially available solvents, such for example as acetone.

The acetylation of carbohydrates is unique in that all the processes now used, so far as I am aware, first make an acetylation product insoluble in acetone and then hydrolyze back to an acetone soluble acetylation product. This procedure was first described by Miles in 1903 in United States Patent No. 838,350 and is the foundation on which the present cellulose acetate industry is built.

In carrying out such prior commercial processes based on the Miles disclosures, it has been the practice to dry cotton or cellulose to about 5 per cent moisture content or less and to react the ingredients in a primary reaction in the proportions necessary to form triacetate as a final product. In such prior processes, the carbohydrate, such as dry cotton having a moisture content of about 5 per cent, is agitated with glacial acetic acid and is then reacted with acetic anhydride and 7 to 10 per cent of sulfuric acid which acts as a catalytic agent. The amount of sulfuric acid added varies between 7 to 10 per cent by weight of the acetic anhydride utilized depending upon the type of acetate desired. To avoid charring, the sulfuric acid is diluted with a considerable quantity of acetic acid and is slowly added to the charge of cotton and glacial acetic acid, and agitated to secure uniformity. The acetic anhydride is then slowly added to the mixture to convert the cellulose to the acetate. A cooling system which provides close temperature control is an essential part of the reacting equipment, and the temperature must be closely regulated by use of the cooling system to prevent too rapid a reaction and too much degradation of the molecule.

The foregoing reactions are usually carried out at temperatures ranging between 40° C.–50° C. (104° F.–122° F.) and at the end of the exothermic reaction the temperature of the mixture is maintained between 50° C.–55° C. (122° F.–131° F.) for a period of about thirty-six to forty hours. At this stage the mixture contains mainly cellulose triacetate which is soluble in chloroform, but not in acetone.

To render the acetates so produced soluble in acetone, the mixture is subjected to a "ripening" and "saponification" process which involves the hydrolysis of the triacetate back to an acetate having a lower acetic acid content. Usually the hydrolysis reaction is carried by addition of water and acetic acid. The temperature of the mixture is maintained at about 40° C.–50° C. (104° F.–122° F.) during this stage for a period of about twelve to eighteen hours.

Cellulose acetate is then precipitated from the solution of cellulose acetate in acetic acid so produced by adding cold water. The cellulose acetate is then filtered out, washed thoroughly and dried at temperatures between 35° C.–40° C. (95° F.–102° F.).

The cellulose acetates so produced are soluble in acetone and have a combined acetic acid content of from 51 to 58 per cent. The acetates produced by these processes are all of low combined acetic acid content, and high viscosity and high melting points. For example, the highest combined acetic acid content claimed for such acetates in any of the prior commercial literature on this subject appears to be from 60 to 62 per cent, and the melting points range from 450° F. to 550° F. Such acetates are not runable below 300° F.

Commercial starch acetate has also been made by the Miles process, or similar variations thereof, and both process and product are subject to the above pointed out disadvantages and objections, especially insofar as the commercial thermoplastic coating field is concerned.

Commercially practical thermoplastic coating composition must have relatively low viscosity and must be runable at temperatures appreciably lower than any temperature at which the surface to be coated will be injured. Usually for thermoplastic composition for coating paper, it is required that this runable temperature be less than 300° F. The prior cellulose and starch acetates have accordingly not been usable for such coating compositions.

The prior processes have also been subject to the following practical disadvantages:

1. They take a great deal of time. The speediest commercial process of the prior art which is at present known is generally that above described and this takes at least forty-eight hours or more to consummate.

2. They are relatively costly due to the fact that acetic anhydride must be used in large excess of the theoretical quantities required for the reactions.

3. Large amounts of $H_2SO_4$ or other more expensive catalysts are used, requiring cooling to retard the reactions and to prevent degradation.

Accordingly, it is the primary object of the present invention to provide a novel process for manufacturing a primary, low viscosity acetylation product of a material selected from the group of carbohydrates consisting of starch or dextrin, and the resultant novel acetylation product which is soluble in acetone and substantially insoluble in water, oils and greases.

A further object of the invention is to provide novel, economical and speedy methods of manufacturing primary starch or dextrin acetylation products which are soluble in a ketone such as acetone.

A further object of the invention is to provide novel methods for manufacturing acetone soluble acetylation products of starch or dextrin which have definite and controlled combined acetic acid content. Specifically, acetone soluble acetylation products having combined acetic acid contents of from approximately 48 per cent to as high as 75 per cent are produced.

A further object of the invention is to provide novel methods of manufacturing starch or dextrin acetylation products which give solutions having low viscosities and melting points, and which are comparatively stable in molten condition, so that they are adaptable for use in thermoplastic coating compositions.

A further object of the invention is to provide a novel method of preparing acetylation products of material selected from the group consisting of starch and dextrin wherein the ingredients are rapidly reacted in the presence of a relatively small quantity of catalyst at a relatively high reaction temperature, which is controlled by the manner of combination of the ingredients, and which results in the production of novel high grade primary low viscosity acetylation products.

A further object of the invention is to provide a novel method of acetylating starch or dextrin wherein the reaction temperature of the material with an acetylation agent such as acetic anhydride is controlled and maintained at a relatively high level without degradation of the product, by use of a much smaller quantity of catalyst than heretofore used. Preferably the reaction is maintained between 140° F. and 250° F. usually at about 235° F. to avoid substantial evolution of fumes during the reaction.

A further object of my invention is to provide a novel method of making a coating composition containing an acetylation product of starch or dextrin, wherein acetylation is followed in a substantially continuous operation by novel process steps leading to manufacture of the coating composition and accompanying high recovery of the acetic acid resulting from acetylation.

Further objects of the invention will presently appear as the description proceeds in connection with the appended claims.

The drawing illustrates a preferred embodiment of apparatus for continuously carrying out my acetylation reactions, recovering acetic acid from the acetylation products, and making thermoplastic coating material containing the acetylation products.

MOISTURE CONTENT

In carrying out my invention, the initial moisture content of the starch or dextrin utilized is an important factor. The presence of an initial moisture content above approximately seven per cent is desirable to my process. In practicing my invention, starch or dextrin having moisture contents above seven per cent and preferably in the range of 7½ per cent to 12 per cent is utilized. Other things being equal, I have found that the lowest viscosity and most useful acetylation products are produced when the starch or other substance has an initial moisture content of 7½ per cent or more, and the most economical results are secured with moisture contents in the range of 7½ per cent to 12 per cent within which range the reactions proceed spontaneously using a minimum amount of catalyst and produce the highest grades of acetylation products. A sharp difference in solubility, viscosity and quality of the product results when initial moisture contents of less than approximately 7 per cent are used. The moisture present in my improved process reacts with acetic anhydride to form acetic acid in proportions beneficial to my improved reactions. If necessary, I wet the carbohydrate to bring the moisture up to the desired point, or add sufficient acetic acid to make up for the moisture deficiency.

While the normal moisture content of commercially available starches lies in this range, the advantage of using carbohydrates while retaining their normal moisture contents or insuring that they have at least normal moisture content has never been appreciated before my invention, as evidenced by the careful predrying of the cellulose to 5 per cent or less moisture content in prior commercial processes such as the Miles process. I consider my recognition of the value of maintaining and insuring moisture contents in the higher limits above specified as one of the important novel features of the invention.

If the carbohydrate used in my process has a moisture content as low as five per cent, the reaction is too slow as there is insufficient water present to properly react with the anhydride, with resultant low reaction temperatures and the necessity for larger quantities of catalyst. Moisture contents higher than 12 per cent result in a too speedy reaction which goes higher than 245° F. and becomes uncontrollable.

CATALYSTS

The use of sulfuric acid catalyst is emphasized in this application because it is commercially best available and is less expensive and generally more satisfactory to handle than any of the usual acetylation catalysts which applicant has used. However, the other known esterification catalysts, such for example as zinc chloride, chlorosulfonic acid, sulfuryl chloride, acetyl chloride, phosphoric acid, nitric acid and ammonium chloride, all of which have an unusually high affinity for water, can be used in the practice of my invention.

In general these other known esterification catalysts must be used in larger quantities than sulfuric acid. For example, to obtain substantially identical results in the reaction, it is necessary to use from 1½ to 1¾ as much sulfuryl chloride ($SOCl_2$) as sulfuric acid, and about five times as much phosphoric acid as sulfuric acid.

Some of these catalysts, for example, zinc chloride, produce lower melting point acetylation products than others, and the particular catalyst used depends in great measure on the product desired. All these catalysts are commercially known substantial equivalents for esterification reactions, available to the technician carrying out the invention.

Where the process is carried continuously beyond the acetate formation stage to the manufacture of a coating composition, such as the method of making "Liquafilm" hereinafter to be described, it is essential that the esterification catalyst be capable of forming a heat stable insoluble salt or like compound upon introduction of a stabilizing or neutralizing agent. All of the foregoing acid catalysts have this quality, which permits removal of the catalyst from the reacted mixture without combination with the ingredients of the coating composition.

Within a given moisture content of the starch, dextrin or dextrose, by varying the amount of sulfuric acid catalyst utilized in my improved process, acetylation products having different characteristics may be obtained. For example, in one example of acetylation of starch, using sulfuric acid equal to about 0.15 per cent by weight of the anhydride, the acetylation product produced was a fine white powder of low viscosity, was tasteless and had a melting point between 284° F. and 302° F. By raising the sulfuric acid content to about 0.425 per cent of the anhydride, the acetylation product was discolored, slightly bitter in taste, and had a melting point of about 230° F. and a viscosity slightly lower than the acetylation product produced by using the .15 per cent sulfuric acid. Using more than 1.0 per cent sulfuric acid, the acetylation product becomes discolored and degraded by the action of the sulfuric acid.

Thus where concentrated sulfuric acid Baumé 66° is employed as the catalyst, as a practical matter and for best commercial results I keep the sulfuric acid catalyst charge well below .15 per cent by weight of the total acetic anhydride.

In general, proper carrying out of the reaction depends both upon the amount of catalyst and the amount of heat applied to the reaction during the acetylation stage. The higher the temperature of the reaction, the less catalyst need be employed, regardless of what catalyst is used.

PROCESS

Briefly, my invention carries out acetylation of starch or dextrin by speedily reacting the starch or dextrin with acetic anhydride at controlled reaction temperatures higher than previously considered possible and in the presence of considerably less catalyst than has heretofore been considered necessary for such acetylation reactions. In commercial practice, I maintain reaction temperatures of between 230° F. and 245° F. (approximately the boiling point of of acetic acid), and I use as a catalyst concentrated sulfuric acid having a specific gravity of Baumé 66° in the amount of about 0.048 per cent to 1.0 per cent by weight of the total acetic anhydride used in the reaction.

The high reaction temperatures and controlled reaction technique employed in the process of the invention, wherein the starch or dextrin is blended with catalyzed anhydride in such a manner as to prevent the high exothermic reaction temperatures from exceeding the boiling point of acetic acid thus enables the commercial process to be carried out using as little as 1/150 of the amount of sulfuric acid used as catalyst in commercial prior art processes of producing starch and cellulose acetates; and, as a result, my improved acetylation products are not appreciably degraded or discolored in the manner which occurs when the prior processes are attempted to be carried out at high temperatures.

The reacted quantities of starch or dextrin and anhydride in my process are carefully measured, based on computed theoretical yield basis. Due to the high exothermic reaction temperatures, care must especially be taken to use accurately predetermined quantities of sulfuric acid or other catalyst and to carefully control blending of the reacting starch, dextrin or dextrose and anhydride. Addition of proportionately too much catalyst, or mixing the ingredients at such a rate as to exceed the boiling point of acetic acid in the mixture, makes the reaction uncontrollable and worthless.

The drawing diagrammatically illustrates apparatus employed in carrying out a preferred manner of practicing the invention. I first introduce a measured quantity of a selected starch or dextrin from a hopper 11 into a container or kettle 12 equipped with a suitable stirrer or other agitating device 13, and heated by a gas burner 10. This starch or dextrin consisting of all the starch or dextrin which is to be reacted, is within the preferred moisture content range above pointed out, and is initially wetted by the addition of a substantial quantity of acetic acid. Such preliminary wetting of the starch or dextrin mass in the kettle with acetic acid makes possible a controlled reaction involving larger quantities of starch or dextrin than would be possible if anhydride was added to unwetted starch or dextrin. Practically, I have found this initial wetting to increase capacity of the process fivefold.

Simply wetting the starch or dextrin with acetic acid does not start a reaction spontaneously. Initiation and continuance of a reaction requires the introduction of acetic anhydride in the presence of both considerable heat and a suitable catalyst. I have discovered that it is necessary to raise the temperature of the wetted mass to at least 140° F. to enable a reaction to start, and in commercial practice the temperature of the wetted mass in the kettle is initially raised to 230° to 235° F. to insure a speedy reaction. The reaction temperature must be at least 170° F. to be noticeable.

After initially heating the wetted mass, a measured quantity of catalyzed acetic anhydride is introduced into the kettle through conduit 14, all the while stirring the mass with device 13. This catalyzed anhydride preferably comprises all the anhydride calculated as necessary for the reaction and it is bled into the mass at a controlled rate for maintaining the reaction temperature high (235° F.-245° F.) but always below the boiling point of acetic acid.

Following is an example of actual commercial batches and procedure employed in carrying out this phase of the invention.

*Example I.—Starch acetylation product*

One hundred and twenty-three pounds of starch (9% H2O) were wetted thoroughly with 118 pounds of glacial acetic acid in a reaction kettle such as kettle 12. The wetted mixture was then heated to about 235° F.; and 234 pounds of acetic anhydride catalyzed with 80.5 grams of 66° Baumé sulfuric acid, bled into the kettle at such a rate as to keep the material at a reacting temperature of approximately between 235° F. and 245° F. until completion of the reaction. This amount of sulfuric acid amounted to approximately .076 per cent by weight of the anhydride used in the reaction.

The acetylation product of starch resulting from Example I is a white powder having a combined acetic acid content of 56 per cent, a melting point of about 310° F. to 320° F. and a viscosity of 1 second as measured by a 44-inch fall of a 50-gram weight in a 12½ per cent solution of the acetate in 90 per cent of acetone and 10 per cent of alcohol at room temperature in a torsion type viscosimeter known as the Cenco viscosimeter.

I have discovered it possible to continue the process from this point to manufacture the thermoplastic coating compositions known as "Liquafilm" without the usual precipitating or separating out of the acetylation product.

In doing this, the reacted mass from kettle 12 is fed directly into a vacuum still 15 by manipulation of valves 16 and 17 in a connecting conduit 18. A suitable neutralizing and stabilizing substance which will react with the catalyst to form a heat stable insoluble salt is mixed with the reacted mass, either in kettle 12 or still 15. Where sulfuric acid is the catalyst, the neutralizer is preferably titanium dioxide, lime, soda ash or magnesium oxide. Any other substance combinable with the particular catalyst to render the catalyst inert can be used. In choosing this substance it must be borne in mind that the catalyst is to be rendered inert with respect to the other "Liquafilm" ingredients to be added, and the inert salt or other compound formed from the catalyst must be sufficiently heat stable to withstand the acetic acid distillation process described below.

At this point the remaining ingredients necessary to make "Liquafilm" are usually put into the still. These remaining Liquafilm ingredients may be those disclosed in my co-pending application Serial No. 296,294, filed September 23, 1939, or may be those ingredients disclosed in the table below. All of these remaining Liquafilm ingredients are of course chosen so that their vapor points and boiling ranges are higher than those of acetic acid.

In addition to the compositions disclosed in Serial No. 296,294, following are the ingredients of two highly useful, newly developed thermoplastic coating compositions, the ingredients of which, other than the ester, can be added directly to the reacted mass as above described.

|  | Per cent | P-13 | Per cent | L. D. 30 |
|---|---|---|---|---|
| Ester base | 62.8 | Starch acetate—Starch acetylation product of the invention. | 60 | Starch acetate. Starch acetylation product of the invention. |
| Active solvent | 18 | Butyl phthalyl—Butyl glycolate. | 22 | Butyl phthalyl. Butyl glycolate. |
| Latent solvent | 5 | Diphenyl phthalate. | 8 | Stearamid (amide of stearic acid). |
| Diluent | 15 | Glycol phthalate resin. | 10 | Chlorinated diphenyl. |

Liquafilm P-13 is of especial value in coating on top of inks, such as printed surfaces; and Liquafilm L. D. 30 is extremely flexible, water and dirt repellent, and resistant to grease and food solvents so as to be usable for food wrapping paper coating.

The mixture now in the still is mixed and heated and vacuum distilled to remove acetic acid therefrom. As the temperature of the mixture is raised to about 270° F., well above the boiling point of acetic acid, the mixture is worked by agitator 19 and vaporized acetic acid passes upwardly into a condensor 21, from which the liquid acetic acid condensate flows through conduit 22 to a collector tank 23. Still 15 is provided with a vacuum gauge 24 and a thermometer well 25, and is heated by a gas burner 26. Condenser 21 is cooled by a cold water circulatory system 27.

Still 15, condenser 21, and tank 23 are subjected to the action of a vacuum pump 28 having a main pipe 29 connected by a branch pipe 31 controlled by valve 32 to tank 23. Pump 28 maintains a vacuum of 26″–28″ of mercury during the process. In this manner, in excess of 90 per cent and often as high as 96 per cent of the total free acetic acid in the mixture can be recovered; and, because of the above conditions and technique of the process, this recovered acetic acid is better than 99 per cent pure. This recovery of 99 per cent pure acid is a very important feature of the improved process. High grade acetic acid (99% pure) is much more expensive than commercial acetic acid (98.6% pure) and, since use of high grade acid is preferable in my process, by reuse of the recovered acetic acid the total cost of the whole process is lowered appreciably.

If desired at least part of the acetic acid can be distilled off into tank 23 before introduction of the other Liquafilm ingredients; but it should not be completely removed at that time as the mass remaining in the kettle would be too viscous to handle efficiently.

After distillation off of as much acetic acid as can be effected, I bleed a small quantity of hot water into the bottom of the still through valve 33. Where the ingredients are in the proportion of the above example, I find about a quart of hot water sufficient. Since the temperature of the mixture in the still is about 270° F., the hot water is immediately converted to steam which collects the remaining acetic acid in the liquid mixture. This dilute acetic acid vapor is passed through the condenser, and the residual acetic acid is collected seperately from the first recovery in tank 34, which is connected to conduit 22 by a pipe 35 controlled by valve 36. A valve 37, below pipe 35, is closed when this operation takes place; and valve 36 is of course closed and valve 37 open when pure acetic acid is being collected in tank 23. Main vacuum line 29 is connected to tank 34 by a branch pipe 38 controlled by a valve 39. This recovered residual acetic acid is about 98.6 per cent pure and satisfactory for usual commercial purposes, thereby still further reducing the expense of the process.

The entire remaining liquid contents of still 15 are then removed through a discharge mouth 41 in the bottom of the still controlled by valve 42 into a vessel 43. The inert salt of the catalyst is removed by centrifuging while maintaining the mixture in liquid condition, thereby effecting complete removal of all catalyst. The remaining liquid mixture is molten Liquafilm which is poured into cooling pans of desired shape for commercial handling and permitted to harden.

My above-described method steps of recovering acetic acid may be employed following known commercial methods of producing starch and cellulose acetates, although generally the recovered acid in such instances is dilute because of hydrolysis of the ester involved in the saponification step.

While it is preferable to carry out the acetate forming portion of the process by preheating the starch or dextrin wetted with acetic acid and gradually bleeding in all of the acetic anhydride, as above described, a variation of the process requiring somewhat more time but wherein little or no initial preheating of the mixture is involved may be employed if desired.

As a first step in carrying out this variation of my invention, a measured quantity of catalyzed acetic anhydride is placed in the kettle; and then a measured quantity of a selected starch or dextrin, which may be wetted with acetic acid, is mixed with the anhydride, the quantities of both being such that the reaction temperature, after initiation of the reaction, will not substantially exceed the boiling point of the acetic acid in the mixture at prevailing atmospheric conditions. When all of the starch or dextrin computed necessary for the reaction is placed in the kettle, the above initial charge of anhydride is less than one-half the total anhydride used in the reaction. These measured quantities of starch or dextrin and anhydride commence to react spontaneously and are permitted to continue to react until the reaction temperatures commence to drop. While this reaction is spontaneous, it is slow to start, and I have found it preferable to preheat to about 140° F. to insure rapid and commercially satisfactory progress of the reaction. This acetylation step takes place relatively rapidly, usually in a few minutes depending on the quantities involved.

The next step comprises gradually adding to the reaction product so formed, a second measured quantity of catalyzed acetic anhydride, at such a rate as to again keep the reaction temperature relatively high, preferably close to, but not exceeding, the boiling point of acetic acid. This step is rather critical. It can be carried out in as little as twenty minutes using laboratory proportions of ingredients, but in commercial quantities the procedure must be slower. For safe commercial operation two to three hours is desirable in producing large sized batches.

The amount of anhydride added is selected according to the nature of the acetate desired to be produced. Using the process of the invention the added anhydride can be computed on approximately the theoretic yield bases to produce diacetates, triacetates, tetra-acetates, etc., as desired, and according to the use for which it is intended. This is not possible with the prior commercial processes, since in all of these the actual yields are materially less than the theoretic yields that may be produced from the reacted ingredients.

Specific examples of desirable commercial practices embodying this latter phase of my invention will now be described.

The viscosity measurements hereinafter referred to are not absolute but are relative, and are indicated by the time of fall of a 50 gram weight through 44 inches of fall using a Cenco torsion type viscosimeter.

*Example II.—Ester 204.—Starch acetylation product*

One hundred and fifty pounds of starch (10% water content) were placed in the kettle and wetted thoroughly with 75 pounds of 99° pure concentrated acetic acid. One hundred and fifty pounds of acetic anhydride were then dumped into the kettle, initiating a spontaneous exothermic reaction which reached a high temperature in the range of 230° F. to 240° F.

After the reaction temperature started to drop, the second charge of catalyzed acetic anhydride was gradually bled into the reacted mixture at such a rate as to keep the reaction temperature above 235° F. but below the boiling point of the acetic acid in the mixture. The total 330 pounds of acetic anhydride used in this reaction were catalyzed by the addition of 125 grams of concentrated sulfuric acid (66° Baumé), representing 0.0834 per cent by weight of the anhydride.

Upon completion of the acetylation reaction when all of the anhydride has been fed into the kettle, the process can be continued to manufacture "Liquafilm" directly as described above, or the starch acetylation product may be precipitated by addition of cold water, filtered out, washed to remove all traces of the acetic and sulfuric acids, and dried to powder form.

*Example III.—Ester 203.—Starch acetylation product*

326.5 pounds of starch (10% water content) were placed in the kettle and wetted thoroughly with 107 pounds of 99 per cent pure acetic acid. 238.5 pounds of acetic anhydride were then dumped into the kettle, initiating the spontaneous exothermic reaction. The second charge of acetic anhydride comprised 480 pounds. The total anhydride was catalyzed by the addition of 369.3 grams of concentrated sulfuric acid (66° Baumé) representing 0.113 per cent by weight of the anhydride. The temperatures of this reaction were the same as in Example II.

In the above four examples, initial wetting of the starch or dextrose with acetic acid enables large quantities of starch or dextrose to be reacted in the kettle without the reaction becoming so violent as to be uncontrollable. This is preferred commercial procedure. However, for smaller batches, it is not necessary to pre-wet the starch, dextrin, or dextrose and this omission does not adversely affect the reaction or the product of acetylation. Following are further examples of this phase of the invention wherein the preliminary wetting step is omitted, representing earlier but operable and usable developments of the invention.

Further examples illustrative of the scope of the invention with regard to the available ingredients and their relative proportions which may be employed in the process will now be given. In each instance, all of the starch and enough (approximately one-half) of the catalyzed anhydride are initially mixed as explained above, in the initial reaction stage; and then the remainder of the catalyzed anhydride is gradually added to complete the reaction, also as above-described. Throughout, the reactions are speeded by maintaining temperatures just below the boiling point of acetic acid.

*Example IV.—Starch acetylation product*

In commercial practice one hundred and fifty pounds of acetic anhydride catalyzed by the addition of 2¼ ounces (.093 per cent by weight) of sulfuric acid, Baumé 66°, is placed in a 300 gallon glass-lined or other suitable kettle, equipped with a reflux condenser and an agitating device. Then 150 pounds of commercial corn starch having moisture content of 10.8 per cent $H_2O$ is added to the agitated anhydride and thoroughly mixed. With normal room temperatures the reaction starts immediately, and being exothermic the temperature of mass reaches approximately 240° F. to 250° F. in relatively short time.

When the above-described initial reaction stage is substantially complete, as evidenced by a slight drop in temperature of the mixture, further acetylation can be instituted. This further acetylation in practice is preferably instituted when the mass reaches a temperature of about 235° F. In this stage about 169 pounds of acetic anhydride catalyzed by the addition of 3¾ ounces (.14 per cent by weight) of 66° Baumé sulfuric acid is gradually bled into the mixture at such a rate as to maintain a reaction temperature ranging approximately from 170° F. to 245° F., and preferably about 235° F. The feeding of the catalyzed anhydride in this stage may be accurately controlled by automatic thermally controlled feeding mechanism.

This latter quantity of anhydride may be varied somewhat according to the water content of the starch employed. The lower the starch water content, the less anhydride need be employed.

This latter stage of reaction requires about an hour for completion. Its completion is evidenced by a drop in temperature of the mixture which occurs a few minutes after the catalyzed anhydride has been completely added.

The reacted mixture is now allowed to stand for about half an hour at which time it is clear and homogeneous, and the temperature has dropped to a point where the product can be precipitated without substantial generation of obnoxious fumes. At this stage the mixture comprises starch acetylation products in solution in acetic acid, from which the acetylation products may be precipitated by combination of the mixture with a large volume (about 8 to 1) of cold water.

The starch acetylation product precipitate is filtered out, thoroughly washed to remove all traces of acid, and then dried by suitable apparatus.

About 220 pounds of stable starch acetylation product in the form of a fine substantially white powder is obtained in the above process. This acetylation product has a high combined acetic acid content of about 65 per cent, is soluble in acetone, and has a melting point of approximately 295° F. to 305° F., gives solutions of low viscosity, and may be used to form clear, colorless films and coatings in the manner set forth in my co-pending application Serial No. 296,294, filed September 23, 1939. The viscosity of this acetylation product measured in a 12½ per cent solution in 90 per cent acetone and 10 per cent alcohol at room temperature in the above-described Cenco viscosimeter was about 0.8 second. It is admirably adapted for use in thermoplastic compositions for coating paper or the like.

The above-described process may be completed in about two and one-half hours or less, depending upon room temperatures and other factors, so that the output of acetone soluble commercially usable acetate from a factory employing the processes of the invention is many times that possible in the prior art using the same equipment and conditions for the production of cellulose acetates.

By increasing the catalyst in the second stage of the foregoing example from 0.14 per cent to 0.28 per cent by weight of the anhydride, the melting point of the acetate produced is reduced by approximately 50° F.

*Example V.—Starch acetylation product*

One hundred pounds of corn starch having a moisture content of 10 per cent water is combined with a total of 220 pounds of acetic anhydride catalyzed with four ounces of sulfuric acid. This reaction yields about 148-150 pounds of acetone soluble starch acetylation product having a combined acetic acid content of 60-62 per cent and a melting point of 285° F.-300° F. The viscosity at 200° F. of a 33⅓ per cent solution of this acetylation product in dimethoxy ethyl phthalate (Methox) as measured in the Cenco meter as above-described, is about 5.5 seconds.

*Example VI.—Starch acetylation product*

Six ounces of laundry starch having a moisture content of 12.5 per cent water is combined with a total of 13.5 ounces of acetic anhydride catalyzed with 0.14 per cent of sulfuric acid. This reaction yields about 9 ounces of acetone soluble starch acetylation product having a combined acetic acid content of 62.2 per cent and a melting point of 305° F.-325° F. The viscosity at 200° F. of a 33⅓ per cent solution of this acetate in dimethoxy ethyl phthalate (Methox) as measured in the Cenco meter above-described is about 16.5 seconds. This acetylation product is used in a coating composition known in the trade as "Liquafilm B-6."

*Example VII.—Starch acetylation product*

Six ounces of potato starch having a moisture content of 12.5 per cent water is combined with a total of 13.5 ounces of acetic anhydride catalyzed with 0.14 per cent of sulfuric acid. This reaction yields about 9 ounces of acetone soluble starch acetylation product having a combined acetic acid content of 55.6 per cent and a melting point of 320° F.-335° F. The viscosity at 200° F. of a 33⅓ per cent solution of this acetylation product in dimethoxy ethyl phthalate (Methox), as measured in the Cenco meter above-described is about 17.5 seconds. This acetylation product is used in a coating composition known in the trade as "Liquafilm B-7."

*Example VIII.—Starch acetylation product*

Six ounces of tapioca flour having a moisture content of 13.4 per cent water is combined with a total of 13.25 ounces of acetic anhydride catalyzed with 0.15 per cent of sulfuric acid. This reaction yields about 9 ounces of acetone soluble starch acetylation product having a combined acetic acid content of 61.3 per cent and a melting point of 295° F.-310° F. The viscosity at 200° F. of a 33⅓ per cent solution of this acetylation product in dimethoxy ethyl phthalate (Methox), as measured in the Cenco meter above-described is about 3.5 seconds. This product is used in a coating composition known in the trade as "Liquafilm B-3."

*Example IX.—Starch acetylation product*

Six ounces of tapioca flour having a moisture content of 12.5 per cent water is combined with a total of 13.5 ounces of acetic anhydride catalyzed with 0.094 per cent of sulfuric acid. This reaction yields about 9 ounces of acetone soluble starch acetylation product having a combined acetic acid content of 61.5 per cent and a melting point of 290° F.-315° F. The viscosity at 200° F. of a 33⅓ per cent solution of this acetylation product in dimethoxy ethyl phthalate (Methox), as measured in the Cenco meter above-described is about 3.9 seconds. This acetylation product is used in a coating composition known in the trade as "Liquafilm B-8."

Example X.—Starch acetylation product

Six ounces of corn starch having a moisture content of 12.5 per cent water is combined with a total of 13½ ounces of acetic anhydride catalyzed by about 0.14 per cent of sulfuric acid. This reaction yields about 9 ounces of acetone soluble starch acetylation product which has a combined acetic acid content of 65.6 per cent and a melting point of approximately 273° F. to 295° F. The viscosity at 200° F. of a 33⅓ per cent solution of this acetylation product in Methox, as measured in the Cenco viscosimeter above-described, is about 2.5 seconds. This acetylation product is used in a coating composition known in the trade as "Liquafilm B-9."

The quantities given in the examples above are satisfactory for a moisture content of from 7 per cent to 12 per cent moisture content, but, with less than 7 per cent moisture, the anhydride should be decreased 6 pounds for each pound deficiency of water and the amount of catalyst should be increased slightly.

The present invention is also applicable to the production of primary acetone soluble acetylation products of low viscosity directly from starch which is bone dry or of very low moisture content by the addition of moisture directly, or indirectly through the use of acetic acid as explained below.

It will be noted that while all of the starches given in the foregoing examples react to form useful products, the acetylation products produced are not interchangeable, but their properties differ depending on the starch used.

The manufacturing procedure followed in the above examples is substantially the same as above-described for the preferred embodiment, care being taken that the reaction temperatures are high enough to proceed rapidly but held below the boiling point of acetic acid.

Example XI.—Dextrin acetylation product

In manufacturing a dextrin acetylation product in accordance with my invention suitable for use in a thermoplastic coating composition known by the trade name of "Liquafilm B-4," ingredients in the following proportions are employed: 6 ounces potato dextrin (10% H₂O), 13.25 ounces acetic anhydride, and 0.15 per cent H₂SO₄.

This reaction is carried out in the manner above-described for the acetylation of starch and yields about 9 ounces of dextrin acetylation product powder. This acetylation product has a combined acetic acid content of 63.3 per cent and a melting point of 278° F.–288° F. A 33⅓ per cent solution of this acetylation product in Methox at 200° F., as measured using the Cenco viscosimeter above described, has a viscosity of about 2.5 seconds.

ACETYLATION PRODUCTS RESULTING FROM USE OF CATALYSTS OTHER THAN SULFURIC ACID

Example XII.—Starch acetylation product

When a very low melting point acetylation product is desired, zinc chloride may be used as a catalyst. Keeping the proportions of starch and anhydride of Example IV the same, and using 16¾ pounds of zinc chloride initially mixed with the acetic anhydride as catalyst, the acetylation product has a melting point of about 237° F. and combined acetic acid content of 65 per cent. By varying the amount of zinc chloride, the melting point of the final acetylation product can be varied between wide limits; and, in general, the greater the amount of zinc chloride the lower the melting point.

SUMMARY OF NOVEL FEATURES

In general, all of the acetylation products of the present invention give solutions of relatively low viscosity. Most of the acetylation products produced by the process of the present invention have melting points ranging between 237° F. and 335° F., the starch acetylation products having melting points mainly between 245° F. and 335° F.

The acetylation products produced by the processes of the invention are moreover high grade clear and substantially colorless in films and coatings, and substantially insoluble in water, greases and oils, so that they are especially suitable for thermoplastic coating compositions for paper or the like.

The following table illustrates the wide difference between the properties of applicant's commercial products produced in accordance with Example IV, and the only readily available commercial starch acetate that applicant could find, which is sold as Niacet starch acetate:

|  | Niacet starch acetate | Applicant's starch acetylation product |
|---|---|---|
| Melting point °F | 350 to 365 | 290 to 305 |
| Combined acetic percent | 57 | 65 |
| Viscosity seconds | 6.8 | 0.8 |

The viscosities in the foregoing tabulation were measured in the Cenco viscosimeter above-described and 12½ per cent solutions of the acetates in 90 per cent of acetone and 10 per cent alcohol at room temperature. In general, applicant's acetylation products have viscosities between 0.5 second and 4.0 seconds, as measured under these conditions on this instrument.

The processes of the present invention produce for the first time primary acetone soluble acetylation products in about two hours commercially, as compared with forty-eight hours or more required by the processes to produce primary acetates insoluble in acetone which then must be hydrolyzed to produce secondary acetone soluble acetates.

Further, the high reaction temperatures employed in the processes of the present invention enable speedy completion of the reactions without the necessity of using catalysts in such proportions or for such periods as will cause material degradation of the carbohydrate molecules.

A further advantage of the present invention is that the ultimate yield of the acetylation product is that approximate to the theoretic yield.

Although the acetylation products made according to the processes of the invention preferably have high combined acetic acid contents, usually from 60 per cent to 67 per cent, by suitably varying the ingredients and proportions above recited, acetone soluble primary acetylation products having combined acetic acid contents of from 53 per cent to 75 per cent have been produced.

The terms starch acetylation product and dextrin acetylation product have been given to my novel product to distinguish it in name over the substances usually known as starch and dextrin acetates. That my product is different from such known starch and dextrin acetates is shown by its different properties and ability to be used in thermoplastic coatings. However, I believe my product may truly be called a starch or a dextrin acetate, as representing the acetate derived from a higher acetylation of starch or dextrin than has previously been obtainable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of preparing a primary, acetone soluble, high grade, low viscosity acetylation product of a material selected from the group consisting of starch and dextrin, which comprises reacting a quantity of said material having a moisture content of approximately 7–12 per cent with acetic anhydride with sulfuric acid as a catalyst in the amount of approximately 0.076 per cent to 1.0 per cent by weight of said anhydride, while maintaining the reaction temperature between 140° F. and the boiling point of acetic acid under reaction conditions.

2. An acetylation product of starch substantially identical with that produced by the process of claim 1, said product having a viscosity in the approximate range of 0.5 to 4.0 seconds measured by a 44 inch fall of a 50 gram weight in a 12½ per cent solution of the acetylation product in 90 per cent of acetone and 10 per cent of alcohol at room temperatures in a torsion type viscosimeter.

3. An acetylation product of starch substantially identical with that produced by the process of claim 1, said product having a melting point between approximately 273° F. and 335° F., and having a viscosity in the approximate range of 0.5 to 4.0 seconds measured by a 44 inch fall of a 50 gram weight in a 12½ per cent solution of the acetylation product in 90 per cent of acetone and 10 per cent of alcohol at room temperatures, in a torsion type viscosimeter.

4. An acetylation product of starch substantially identical with that produced by the process of claim 1, said product having a combined acetic acid content between 53 per cent and 75 per cent and a melting point between approximately 273° F. and 335° F., and having a viscosity in the approximate range of 0.5 to 4.0 seconds measured by a 44 inch fall of a 50 gram weight in a 12½ per cent solution of the acetylation product in 90 per cent of acetone and 10 per cent of alcohol at room temperatures in a torsion type viscosimeter.

5. An acetylation product of starch substantially identical with that produced by the process of claim 1, said product having a combined acetic content between approximately 53 per cent and 65 per cent and a melting point between 273° F. and 335° F., and having a viscosity in the approximate range of 0.5 to 4.0 seconds measured by a 44 inch fall of a 50 gram weight in a 12½ per cent solution of the acetylation product in 90 per cent of acetone and 10 per cent of alcohol at room temperatures in a torsion type viscosimeter.

6. The method of preparing a primary, acetone soluble, low viscosity, high grade acetylation product of starch, which comprises reacting measured quantities of said starch having a moisture content of approximately 7–12 per cent and acetic anhydride with sulfuric acid as a catalyst in the amount of 0.076 per cent to 0.15 per cent by weight of said anhydride, while maintaining the reaction temperature between 140° F. and the boiling point of acetic acid under reaction conditions.

JOHN D. MURRAY.